Dec. 8, 1953

P. M. WADDILL ET AL
PROCESS FOR EFFECTIVE CATALYTIC
CONVERSION OF HYDROCARBONS 2,662,003

Filed April 8, 1946

INVENTOR.
P. M. WADDILL
F. C. FOWLER
BY *Hudson & Young*
ATTORNEYS

Dec. 8, 1953 P. M. WADDILL ET AL 2,662,003
PROCESS FOR EFFECTIVE CATALYTIC
CONVERSION OF HYDROCARBONS
Filed April 8, 1946 2 Sheets-Sheet 2

INVENTOR.
P. M. WADDILL
F. C. FOWLER
BY Hudson & Young
ATTORNEYS

Patented Dec. 8, 1953

2,662,003

UNITED STATES PATENT OFFICE 2,662,003

PROCESS FOR EFFECTIVE CATALYTIC CONVERSION OF HYDROCARBONS

Paul M. Waddill, Bartlesville, and Frank C. Fowler, Norman, Okla., assignors to Phillips Petroleum Company, a corporation of Delaware Application April 8, 1946, Serial No. 660,362

15 Claims. (Cl. 48—75)

This invention pertains to apparatus for effecting high temperature catalytic reactions in the vapor phase.

One particular embodiment of the invention relates to apparatus for effecting high temperature catalytic reactions in vapor phase in which heat for the reaction is supplied by heat transfer material heated externally of the reactor.

Conventional pebble heater apparatus provides a pebble heating chamber positioned above a reaction chamber with a connecting neck between the two chambers. Pebbles of ceramic, metal, or other refractory materials are heated by direct contact with hot combustion gas as they flow through the pebble heater and pass through the neck into the reaction chamber where they give up heat to reactant gases being passed through the reaction chamber, usually in countercurrent flow to the pebbles which are descending by gravity flow therethrough. Considerably higher temperatures are necessarily maintained in the heater than in the reactor which frequently makes it undesirable to utilize pebbles coated, impregnated, or constructed of catalytic materials. The catalysts desirable in a given process frequently will not withstand the temperatures required in the heater but will not be unduly deactivated by the temperatures required in the reactor.

The principal object of this invention is to provide apparatus of the pebble heater type which will permit the use of catalytic materials in the reaction chamber without subjecting them to the severe temperatures of the pebble heater proper.

It is also an object of this invention to provide desirable fixed arrangements of catalyst in the reaction chamber which will not interfere materially with the flow of pebbles therethrough.

A further object of the invention is to provide a novel and useful means of returning the pebbles from the reactor to the heater in a pebble heater apparatus.

Other objects of the invention will become apparent from the accompanying description.

The term "pebble" as used throughout the specification denotes any refractory material in flowable form and size which can be utilized to carry heat from one zone to another. Pebbles are conventionally substantially spherical and are about ⅛" to 1" in diameter, with the preferred size for high temperature processes being subject to the means used to lift the pebbles and other design considerations; e. g., the smaller sizes are more desirable if a gas lift is used for elevating the pebbles, whereas the larger sizes are more desirable if a bucket elevator is chosen. Pebbles must be of refractory materials which will withstand temperatures at least as high as the highest temperature attained in the pebble heating zone. They may be of ceramic, metal, or other refractory materials. It is important that the pebbles be quite dense in order to permit high gas flow rates without entrainment of pebbles in the effluent gases from any of the chambers. Pebbles composed of alumina, beryllia, "carborundum," mullite, periclase, and zirconia when properly fired serve very well at high temperatures, some of them withstanding temperatures up to at least 4000° F. It is desirable when operating in the conversion zone at the higher temperatures to use the best high temperature refractories, at least in the hottest areas of the pebble heating chamber and in the combustion furnace.

This invention provides apparatus of the pebble heater type in which a catalyst for the desired reaction is fixed in the reaction chamber in such a manner as not to unduly obstruct the flow of pebbles therethrough yet to adequately catalyze the reaction involved. Pebbles which are heated to high temperatures such as 1500° to 3500° F. in the pebble heater by direct contact with combustion gas are permitted to flow through the reactor by gravity, giving up a considerable amount of heat to the reactant gases being passed continuously into the reactor. Any arrangement of fixed catalyst in the reactor obviously must not prevent or unduly reduce the flow of pebbles therethrough.

The particular catalyst to be used and the form which is most suitable will of course depend upon the type of reaction to be catalyzed. Catalysts for the many reactions which may be advantageously performed in pebble heater apparatus are well known and need not be discussed here. The catalyst may be suspended in the form of perforate metal sheets, such as screens, from high temperature alloy tubes positioned in vertical rows across the reactor and extending therethrough and in communication with headers outside of the reactor so that a cooling fluid, such as steam or the reactants to be converted, may be circulated through the tubes in order to maintain their temperature below the softening point. The screens may be of any metal which is catalytic and will withstand the temperature to be maintained in the reactor. Nickel, iron, cobalt, chromium, molybdenum, tungsten, uranium, vanadium, copper, gold, silver, platinum metals, and alloys thereof may be formed into screens or plated on such to serve as catalytic materials. It is also feasible to convert the surface of the metal screens into compounds which are catalytic for a given process, e. g., many of the metals recited may be given a surface conversion to the metal sulfide for catalyzing such reactions as the conversion of hydrocarbons and sulfur containing gases to $CS_2$, hydrogenation and dehydrogenation of hydrocarbons, and other reactions catalyzed by metal sulfides. The metal screens may be suspended so as to form a series of parallel narrow walled spaces approximately the width of the tube diameter or larger, if desired, which spaces may be desirably filled with catalytic material of the same or different nature from the screen material. Thus a series of nickel screens may be used to form spaces filled with nickel wool which may function as a metal catalyst or the metal may be surface coated with sulfide, oxide, etc. where such compounds are more effective catalysts.

In order to obtain a more complete understanding of the invention, reference may be had to the accompanying drawing in which Figure 1 is a diagrammatic showing of an arrangement of pebble heater apparatus in accordance with the invention.

Figure 1:
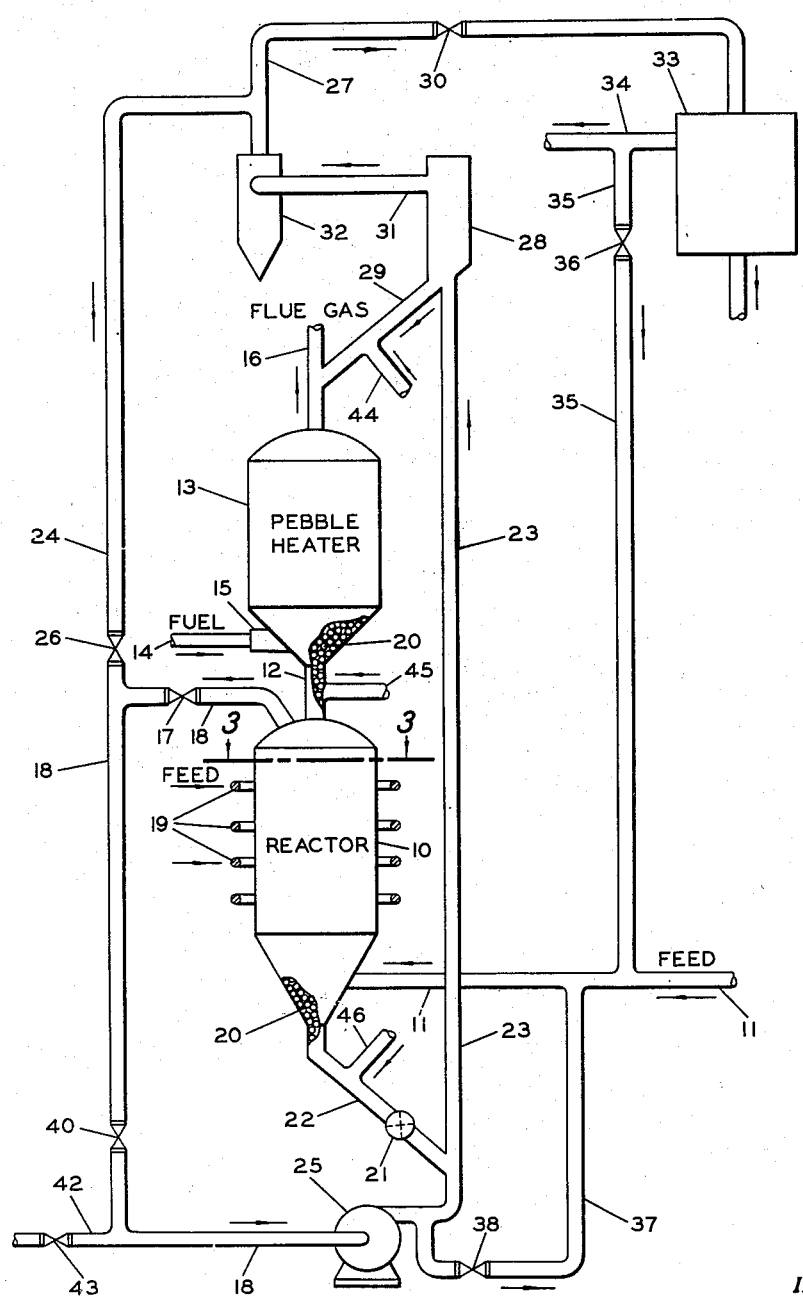

By way of illustration, the invention will be described further with particular reference to a process in which low-boiling hydrocarbons are converted to water gas by reaction with steam. This type of process is carried out advantageously at temperatures between about 1500° F. and 3000° F. in the presence of metallic nickel as a catalyst. Using the apparatus of Figure 1, a suitable mixture of hydrocarbons and steam is introduced into reaction chamber 10 through line 11 where it is raised to reaction temperature by heat supplied by a stream of hot alumina pebbles 20. The pebbles entering reactor 10 have just passed through neck 12 from pebble heater 13 where they have been heated by direct contact with combustion gas to a temperature several hundred degrees above the reaction temperature required in chamber 10. Fuel for combustion is supplied along with the desired amount of air through line 14 which leads into combustion chamber or burner 15. Flue gases are removed from heater 13 through stack 16.

Figure 2:
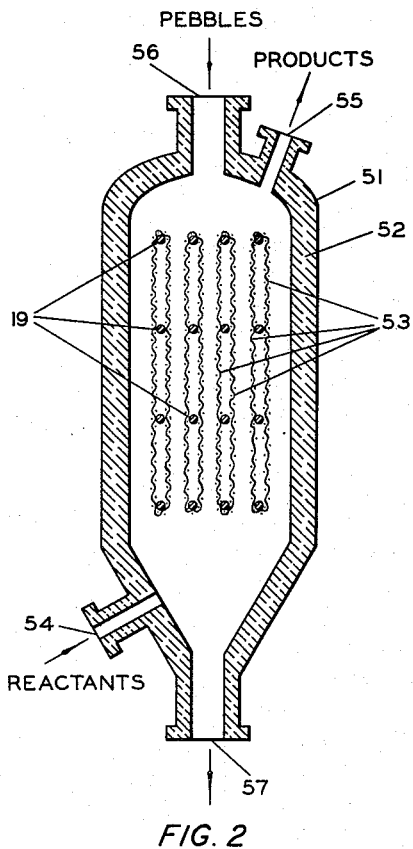
Figure 2 is a longitudinal sectional view of a converter or reaction chamber showing a specific arrangement of catalyst therein.

Returning to the reaction in chamber 10, the mixture of hydrocarbons and steam rapidly becomes heated by contact with the hot pebbles therein and also by contact with the nickel screens suspended therein as shown in Figure 2. The feed gas may be desirably heated by circulation through pipes or tubes 19 which extend through chamber 10 and support nickel screens (53 shown in Figure 2) serving as catalyst for the reaction. Reaction products are taken off through line 18 controlled by valves 17 and 40.

The flow of pebbles through reaction chamber 10 and heater 13 is regulated by star valve 21, or other feeder device, in line 22 in response to temperature variations in chamber 10. Feeder 21 allows pebbles to pass from line 22 into gas lift 23 for elevation to heater 13. The gas used for elevating pebbles in lift 23 is largely product gas drawn from line 18 by blower 25. Product gas is also conveniently recycled through line 24 controlled by valve 26 and connecting with product line 27. Blower 25 is operated in such manner as will carry $\frac{3}{16}$" alumina pebbles up lift 23 to enlarged conduit 28 where the lower velocity of gas fails to suspend the pebbles and permits them to drop into return conduit 29 which carries them back to the pebble heater via stack 16. Product gas passing through lift 23 and conduit 28 is sent via line 31 through cyclone separator 32 in which any fines entrained in the gas are removed before being passed via line 27 controlled by valve 30 to product separation means 33. Product taken off via line 34 is transferred to other purification means and/or a portion of it may be recycled to the reaction chamber via line 35 controlled by valve 36 in processes where this step is advantageous. Also, where desired, product gas may be recirculated via line 37 controlled by valve 38 to the reaction chamber via line 11. In cases where not all of the product gas is required to lift the pebbles through lift 23 and in cases where other gases are utilized through line 42, any portion of it may be passed directly to separation means 33 via lines 24 and 27. As just indicated, any non-deleterious gas may be introduced to the gas lift via line 42 controlled by valve 43, or by mixing product gas from line 18 with such gas.

The apparatus may be operated at atmospheric, subatmospheric, or superatmospheric pressures but it is advantageous to maintain the pressures in the pebble heater and in the reactor as nearly the same as possible in order to minimize the passage of gas from one chamber to another. Where it is necessary, steam may be introduced through lines 44, 45, and 46 as a block to movement of gases through conduits 29, 12, and 22, respectively.

In Figure 2, 51 is a shell or casing surrounding a thick wall of refractory insulating material 52 which encloses a reaction space in which are positioned several vertical rows of pipes 19. Catalytic metal screens or perforate metal sheets 53 are suspended over and/or from pipes 19 forming vertical double rows of screens spaced sufficiently far apart to permit easy flow of pebbles between the several double rows and likewise spaced from the reactor wall so as to permit flow of pebbles through the outermost space thus provided. The uppermost tubes or pipes should be positioned sufficiently low to bring them all within the angle of repose of the pebble bed so that pebbles will pass down the outermost space provided. Numeral 54 designates an inlet for reactants while 55 designates a product outlet. A neck 56 provides for admitting pebbles and 57 is a pebble outlet. The relatively narrow space between screens may be desirably filled with catalytic material of the same or of a different nature than the screens.

Figure 3:
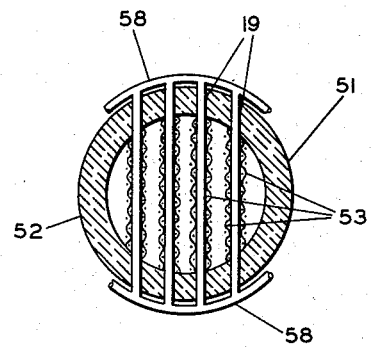
Figure 3 is a cross-section of the reaction chamber shown in Figure 1 taken on the line 3—3, showing one arrangement of fixed catalyst.

Figure 3 shows headers 58 connected with tubes or pipes 19 for circulation of reactants, steam, etc., a feature which may be utilized to protect the tubes from excessive temperatures. This view shows one embodiment of the invention involving a cylindrical type reactor.

Figure 4:
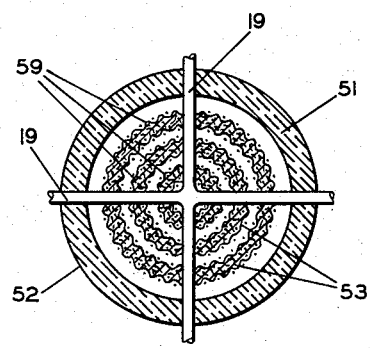
Figure 4 is a cross-section of a reaction chamber similar to that shown in Figures 1 and 3 but showing a different arrangement of fixed catalyst.

Figure 4 shows another embodiment of the invention in which the catalyst is arranged in concentric, annular, spaced apart sections each of which may comprise two concentric, perforate cylindrical metal sheets spaced relatively close to each other and having the space between them filled with a like or different material in readily permeable form such as metal wool, shavings, metal oxide gels, and other conventional catalytic material in particulate form. The sections 59 are made up of screens or perforate metal sheets 53 and are suspended by and fixed in the reactor on tubes or rods 19 which likewise may carry a cooling fluid to protect them from excessive heat.

Figure 5:
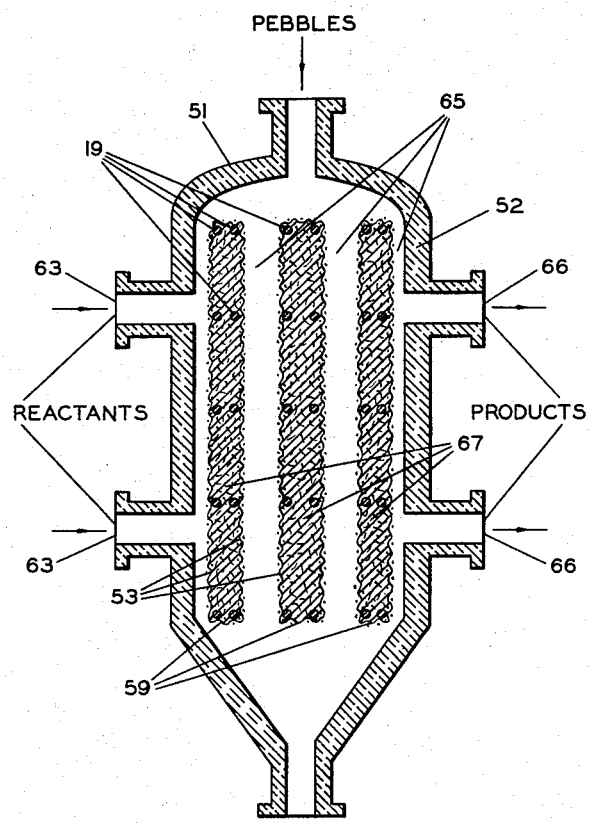
Figure 5 is a longitudinal section of a reaction chamber similar to that shown in Figures 1 and 2 but showing another arrangement of catalyst.

The longitudinal section shown in Figure 5 illustrates another modification of the invention in which the reactants enter a multiplicity of inlets 63 and traverse the reactor through alternate sections of catalyst 59 and hot pebbles in spaces 65, passing out of the reactor through a multiplicity of outlets 66. Pipes or rods 19 extend across the reactor as supports for the catalyst sections which may be constituted of the same materials as the catalyst sections described in connection with Figures 2 and 4, i. e., metal screens or perforate metal sheets 53 and metal wool filling 67. Any particulate catalytic refractory material may be used as a filling in lieu of metal wool.

It is of course assumed that the heat-transfer material of which the pebbles are constituted is relatively non-catalytic. While the screens or perforate metal sheets which form the walls of the catalyst sections are preferably catalytic to the reaction involved, they also may be constructed of materials selected for their durability and refractory character rather than their catalytic effect as are the pebbles.

The invention provides apparatus which is particularly advantageous in that it permits the use of catalytic material in the reaction zone of a pebble heater system without subjecting the catalyst to the severe oxidizing and heat conditions of the pebble heating zone. Fixed catalysts of the invention have particularly long life and require less frequent regeneration than catalyst material that is passed through the combustion zone of a pebble heater. Fixed catalyst, whether comprised merely of perforate metal sheets and screens or filling material between such sheets and screens, are much less subject to erosion and mechanical deterioration than moving type catalyst. There is also considerably less wear on the refractory linings of the apparatus for a given conversion with fixed catalyst as compared with moving catalyst or no catalyst at all, thus effecting considerable economy of operation.

The various modifications described provide for rather flexible operation to meet the varied conditions required in different processes. It will be understood that certain features and sub-combinations may be desirable although not specifically described. This is contemplated by and is within the scope of the claims. It is also obvious that certain changes in details within the scope of the claims may be made without departing from the spirit of this invention. It is therefore to be understood that our invention is not to be unduly or unnecessarily limited to the specific details described and shown.

We claim:

1. In an apparatus for conducting high temperature catalytic reactions in the vapor phase by contacting the vapors to be reacted with a stream of hot pebbles, the combination of an upper chamber for heating said pebbles; an inlet in said upper chamber for admitting pebbles; a fuel line leading to the lower section of said upper chamber and a flue connecting with the upper section thereof; a lower chamber for heating said vapors; an unobstructed conduit forming a neck between said upper and lower chambers for flow of pebbles therebetween; an outlet in the lower portion of said lower chamber for removing pebbles therefrom; means for transferring pebbles from said pebble outlet to said pebble inlet in said upper chamber; supply and discharge means leading to and from said lower chamber for flow of said vapors thereto and reaction products therefrom; and a plurality of horizontally spaced-apart, continuous, gas-pervious catalyst masses fixed in vertical rows in said lower chamber so as to provide vertically continuous, unobstructed pebble passageways between said masses extending the major portion of the height of said lower chamber and connecting directly with the pebble space in the upper and lower sections of said lower chamber.

2. The apparatus of claim 1 in which the catalyst is in the form of a pervious flexible sheet supported on horizontally positioned heat exchange tubes spaced in such manner as to permit relatively free flow of pebbles through the chamber.

3. In an apparatus for conducting high temperature catalytic reactions in the vapor phase by contacting the vapors to be reacted with a moving mass of hot pebbles, the combination of an upper chamber; a pebble inlet and a combustion gas outlet in the upper portion of said upper chamber; means for introducing fuel gas into the lower portion of said upper chamber to effect direct heating of the pebbles therein; a lower chamber having a pebble outlet at the lower end thereof; supply and discharge means leading to and from said lower chamber for flow of said vapors thereto and reaction products therefrom; a conduit of substantially reduced cross-section forming an unobstructed throat between said upper and lower chambers, said chambers and throat enclosing a contiguous column of pebbles extending from the upper portion of said upper chamber to the lower portion of said lower chamber; a plurality of horizontally spaced-apart, continuous, gas-pervious catalyst masses fixed in vertical rows in said lower chamber so as to provide vertically continuous, unobstructed pebble passageways between said masses extending the major portion of the height of said lower chamber and communicating directly with the pebble space in the upper and lower sections of said lower chamber; and means for transferring pebbles from said lower chamber to said upper chamber.

4. The apparatus of claim 3 in which the catalyst is in screen form supported by horizontally positioned heat exchange tubes and spaced in such manner as to permit relatively free flow of pebbles through the chamber.

5. The apparatus of claim 3 in which the lower chamber is cylindrical and said catalyst comprises a plurality of annular pervious catalytic sections supported on transverse heat-exchange tubes, said sections being spaced to permit relatively free flow of pebbles through said chamber.

6. The apparatus of claim 3 in which supply and discharge means leading to and from the lower chamber are positioned in the lower and upper portions, respectively, of said chamber.

7. The apparatus of claim 3 in which supply and discharge means leading to and from the lower chamber comprise a plurality of conduits positioned intermediate the ends of said chamber, said supply means being spaced vertically along one wall of said chamber, and said discharge means being spaced vertically along the opposite wall of said chamber providing for flow of vapors transversely to the flow of pebbles in said chamber and through said gas-pervious catalyst.

8. In an apparatus for conducting high temperature catalytic reactions in the vapor phase by contacting the vapors to be reacted with a moving mass of hot pebbles, the combination of an upper chamber enclosing a mass of pebbles; a pebble inlet and a combustion gas outlet in the upper portion of said upper chamber; means for introducing fuel gas into the lower portion of said upper chamber to effect direct heating of the pebbles therein; a lower chamber enclosing a mass of pebbles and having a pebble outlet at the lower end thereof; supply and discharge means leading to and from said lower chamber for flow of said vapors thereto and reaction products therefrom, a pebble-filled conduit of substantially reduced cross-section forming a throat between said upper and lower chambers, the mass of pebbles in said upper chamber, in said throat, and in said lower chamber forming a compact, contiguous mass; a plurality of gas-pervious continuous catalyst masses arranged in vertical rows and uniformly spaced-apart throughout their extent so as to form pebble passageways traversing said chamber from top to bottom thereof; means for transferring pebbles from said lower chamber to said upper chamber comprising a pneumatic lift; blower means for increasing the velocity of gas flow through said lift; conduit means connecting said discharge means in said lower chamber with said blower means for passage of reaction products to said lift; and means for releasing said pebbles from said lift to said pebble inlet.

9. In an apparatus for conducting high temperature reactions in the vapor phase by contacting the vapors to be reacted with a moving mass of hot pebbles, the combination of an upper chamber having a pebble inlet and a combustion gas outlet in the upper portion thereof, means for introducing fuel gas into the lower portion of said upper chamber to effect direct heating of the pebbles therein, a lower chamber having a pebble outlet at the lower end thereof, a plurality of gas-pervious continuous catalyst masses arranged in vertical rows and uniformly spaced-apart throughout their extent so as to provide continuous pebble passageways traversing the reactor from the upper to the lower portion thereof, supply and discharge means leading to and from said lower chamber for flow of said vapors thereto and reaction products therefrom, a conduit of substantially reduced cross-section forming a throat between said upper and lower chambers, a contiguous mass of pebbles extending downwardly through said apparatus from the upper portion of said upper chamber to the pebble outlet in said lower chamber means for transferring pebbles from said lower chamber to said upper chamber comprising a pneumatic lift, blower means for increasing the velocity of gas flow through said lift, conduit means connecting said discharge means in said lower chamber with said blower means for passage of reaction products to said lift, and means for releasing said pebbles from said lift to said pebble inlet.

10. A process for effecting catalytic conversion of hydrocarbons which comprises continuously heating a contiguous, refractory mass of heat-transfer pebbles in an upper enclosed zone to a temperature above conversion temperature; gravitating the heated pebbles through a series of parallel, vertical passageways between and in contact with vertical rows of gas-pervious catalyst masses in a conversion zone, passing a vaporous feed stream comprising principally hydrocarbon through said conversion zone so as to pass through said catalyst masses and catalytically convert the hydrocarbon to more desirable gaseous products; and recovering a gaseous product from the conversion zone.

11. The process of claim 10 in which the feed is passed through the reaction zone across the alternate vertical layers of pebbles and catalyst so as to effect alternate heat-exchange and catalytic reaction.

12. The process of claim 10 in which the feed is passed upwardly from the lower portion of the conversion zone and the product effluent is withdrawn from the upper portion thereof.

13. The process of claim 10 in which the feed stream comprises a low boiling hydrocarbon admixed with steam and the catalyst is a water gas forming catalyst so as to effect the formation of water gas by interaction of the hydrocarbon and steam.

14. An apparatus for reacting a fluid reactant in the presence of a solid catalyst which comprises, in combination a reaction chamber having means for introducing a fluid reactant thereto and means for withdrawing fluid reaction products therefrom; inlet means in the upper portion of said chamber for introducing solid, particulate, heat exchange material thereto; outlet means in the lower portion of said chamber for withdrawing said material therefrom; a plurality of horizontally spaced-apart, continuous, gas-pervious catalyst masses fixed in vertical rows in said chamber so as to provide vertically continuous pebble passageways between said masses, said passageways being in open, unobstructed communication with the inlet and outlet means for said heat exchange material; and a contiguous, compact, fluent mass of solid particulate heat exchange material extending through said passageways from said inlet means to said outlet means.

15. An apparatus for reacting a fluid reactant in the presence of a solid catalyst which comprises, in combination a reaction chamber having means for introducing a fluid reactant thereto and means for withdrawing fluid reaction products therefrom; inlet means in the upper portion of said chamber for introducing solid, particulate, heat exchange material thereto; outlet means in the lower portion of said chamber for withdrawing said material therefrom; and a plurality of horizontally spaced-apart, continuous, gas-pervious catalyst masses fixed in vertical rows in said chamber so as to provide vertically continuous pebble passageways between said masses, said passageways being in open, unobstructed communication with the inlet and outlet means for said heat exchange material.

PAUL M. WADDILL.
FRANK C. FOWLER.

References Cited in the file of this patent

UNITED STATES PATENTS

| Number | Name | Date |
|---|---|---|
| 1,148,331 | Olsson | July 27, 1915 |
| 1,250,879 | Hirt | Dec. 18, 1917 |
| 1,351,859 | Lowe | Sept. 7, 1920 |
| 2,183,301 | Bossner et al. | Dec. 12, 1939 |
| 2,398,954 | Odell | Apr. 23, 1946 |
| 2,407,700 | Huff | Sept. 17, 1946 |
| 2,417,393 | Evans | Mar. 11, 1947 |
| 2,447,306 | Bailey | Aug. 17, 1948 |
| 2,448,290 | Atwell | Aug. 31, 1948 |
| 2,459,836 | Murphree | Jan. 25, 1949 |

OTHER REFERENCES

Riegel, "Industrial Chemistry," 3d ed., 1937, page 273.